Patented Feb. 22, 1927.

1,618,370

UNITED STATES PATENT OFFICE.

MAX ENGELMANN AND ALAN R. ALBRIGHT, OF WILMINGTON, DELAWARE, ASSIGNORS TO E. I. DU PONT DE NEMOURS & COMPANY, OF WILMINGTON, DELAWARE, A CORPORATION OF DELAWARE.

NONHYGROSCOPIC SEED DISINFECTANTS.

No Drawing. Application filed June 8, 1923. Serial No. 644,237.

This invention relates to non-hygroscopic seed disinfectants which are adapted for use either in dust form or in aqueous solution, and it pertains especially to non-hygroscopic powders containing mercurized phenols associated with an alkali-metal carbonate and with an alkaline earth metal oxide or hydroxide. The mercurized substances used in our compositions are the same as those described in U. S. Patent 1,167,642. Instead of mercurized phenols in our above mentioned mixtures, we may use mercurized benzene-carboxylic acids, these latter compounds being for practical purposes the equivalents of the mercurized phenols.

The main object of our invention is to provide a seed disinfectant which can be marketed and used in the form of a non-hygroscopic dust or powder, thereby facilitating, especially in certain localities, the application of the disinfectant to the seed.

In U. S. Patent 1,167,642 there is described a process for the preparation of soluble disinfectants from mercurized phenols or carboxylic acids; these disinfectants are mixtures containing a large proportion of caustic alkalies, and their preparation, on account of the hygroscopic nature of the alkali, is possible only if moisture be carefully excluded. The finished products described in said patent also are very hygroscopic and for the same reason are, according to the manufacturer's advice, to be protected from moisture by keeping in well-closed containers. The use of such products as those just described, in dust form, for the purpose for example of disinfecting seeds, is impossible because of this hygroscopicity.

It has now been found that dry mixtures, not hygroscopic but stable in the presence of air containing moderate amounts of moisture, may be prepared if mercurized phenols are mixed or ground together with carbonates of the alkali metals and oxides or hydroxides of the alkaline earth metals, or the like. The resulting mixtures not only have the advantage over those described in the above patent that they may be applied as a dusting treatment for seeds, but they may, in addition, be used effectively in the form of aqueous solutions.

The products described in U. S. Patent 1,167,642 are completely soluble in water, whereas the products described in this application are not completely soluble in water, nor is the active constituent rendered soluble by either of the accompanying substances; but treatment of the mixture with water renders substantially the whole of the active constituent available and potent in the fullest degree for the purpose of disinfection (primarily of seeds but also in the general sense as well), and results in the formation of a harmless inert insoluble material.

Our invention may be illustrated by the following example:—

Three hundred parts of finely ground mercurized o-chlorphenol acetate (or other salt) is mixed with 300 parts hydrated lime and 400 parts dry sodium carbonate; the resulting fine powder or dust when treated with water decomposes into calcium carbonate which is precipitated, and the sodium salt of mercurized chlorphenol.

Other substituted or unsubstituted free mercurized phenols or their salts may be used in place of mercurized o-chlorphenol-acetate, sulfate, or other salt. As specific examples of these we may mention the following; the acetate, sulfate, or other salts of mercurized p-chlorphenol, mercurized 2:4-dichlor phenol, or any mixture of these substances with the o-chlorphenol derivative; a salt of mercurized o-nitrophenol or of mercurized p-nitrophenol, or a salt of mercurized phenol. Instead of lime with sodium carbonate or potassium carbonate, there may be used other alkaline earths such, for example, as calcium oxide, barium hydroxide, barium oxide, magnesium oxide, magnesium hydroxide, aluminum oxide or hydroxide, with sodium or potassium carbonate.

The proportions of the diluents may be varied between wide limits; thus, we may take for example a mixture consisting of 550 parts of mercurized chlorphenol sulfate, 180 parts of hydrated lime, and 270 parts of dry sodium carbonate, but our invention is not, of course, limited to these proportions of materials.

Our new products may, as desired, be mixed with additional soluble or insoluble indifferent substances, dyestuffs or other disinfecting materials and the combinations of these materials as well as their relative proportions may be varied within wide ranges.

We claim:

1. A disinfectant composition comprising a mercurized phenol, an alkali-metal carbonate, and an alkaline earth, said composition being applicable in dust form to seeds.

2. A disinfectant composition comprising a mercurized phenol, an alkali-metal carbonate, and an alkaline earth.

3. A disinfectant composition comprising a mercurized phenol, an alkali-metal carbonate, and an alkaline earth, said composition being non-hygroscopic and dissolving in water to form a solution of the mercury compound and a precipitate consisting of an alkaline earth metal carbonate.

4. A disinfectant composition comprising a mercurized phenol, an alkali-metal carbonate, and a hydroxide of an alkaline earth metal, said composition being applicable in dust form to seeds.

5. A disinfectant composition comprising a mercurized o-chlorphenol acetate, an alkali-metal normal carbonate, and an alkaline earth, said composition being non-hygroscopic.

6. A disinfectant composition comprising a mercurized phenol and substantially equimolecular proportions of an alkali-metal normal carbonate and an alkaline earth, said composition being suitable for use as a seed disinfectant in powdered form.

7. A disinfectant composition comprising a mercurized phenol and substantially equimolecular proportions of an alkali-metal normal carbonate and an alkaline earth, the molecular proportion of the mercurized phenol being substantially less than the molecular proportions of the other ingredients, said composition being suitable for use as a seed disinfectant in powdered form.

8. A disinfectant composition comprising 300 parts of mercuri-o-chlorphenol acetate, about 300 parts of calcium hydroxide, and about 400 parts of sodium carbonate, said ingredients being thoroughly mixed and in the form of a fine powder.

9. A disinfectant composition as set forth in claim 1 in which the mercury compound is a salt of mercuri-phenol.

10. A disinfectant composition as set forth in claim 1 in which the degree of fineness of the composition is such that practically all of it will pass through a 200 mesh sieve.

11. A disinfectant composition as set forth in claim 2 in which the degree of subdivision of the composition is such that practically all of it will pass through a 200-mesh sieve.

12. A disinfectant composition sufficiently subdivided to pass through a 200-mesh sieve and comprising a mercurized phenol, an alkali-metal carbonate, and an alkaline earth, said composition being non-hygroscopic and dissolving in water to form a solution of the mercury compound and a precipitate consisting of an alkaline earth metal carbonate.

13. A disinfectant composition comprising a mercurized phenol and substantially equimolecular proportions of an alkali-metal normal carbonate and an alkaline earth, said composition being in the form of a powder capable of passing through a 200-mesh sieve.

14. A disinfectant composition comprising 300 parts of mercuri-o-chlorphenol acetate, about 300 parts of calcium hydroxide, and about 400 parts of sodium carbonate, said ingredients being thoroughly mixed and in the form of a fine powder practically all of which is capable of passing through a 200-mesh sieve.

15. The herein described new disinfecting materials containing mercury derivatives of phenols, mixed with alkali-metal carbonates and alkaline earths, which materials are non-hygroscopic, and therefore suitable for the purpose of seed-disinfecting either in dust form or after treatment with water; are powders of a degree of fineness such that while perfectly dry they will practically entirely pass through a 200 mesh sieve, are stable in the presence of moderately moist air, and give, on treatment with dilute hydrochloric acid, ionizable salts of mercury in which the metal may be recognized by the usual tests.

16. The herein described new disinfecting materials which comprise intimate mixtures of mercurized chlorphenols with hydrated lime and sodium carbonate, said mixtures being non-hygroscopic, so that they may be applied for the purpose of seed disinfecting either in dust form or after treatment with water, and said mixtures being powders of a degree of fineness such that while perfectly dry they will practically entirely pass through a 200-mesh sieve, and being stable in the presence of moderately moist air, and giving, on treatment with dilute hydrochloric acid, ionizable salts of mercury in which the metal may be recognized by the usual tests.

17. A substantially non-hygroscopic disinfectant composition including a water-insoluble mercurized phenol, said composition being capable of reacting with water to yield a water-soluble alkali salt of mercurized phenol.

18. A substantially non-hygroscopic disinfectant composition including a water-insoluble mercurized phenol, said composition also containing substances capable of reacting with water to yield a product that will combine with said mercurized phenol to form a water-soluble salt.

19. Seeds having intimately associated therewith mixtures of mercuri-chlorphenol with hydrated lime and anhydrous sodium carbonate.

20. Seeds coated with a dry dust or powder consisting of mercuri-chlorphenol, hydrated lime and anhydrous sodium carbonate.

21. Seeds coated with a non-hygroscopic, water soluble composition containing a mercurized-phenol compound, an alkali salt, and an alkaline earth.

In testimony whereof we affix our signatures.

MAX ENGELMANN.
ALAN R. ALBRIGHT.